Jan. 25, 1938.   F. H. WATSON   2,106,671
VALVE STEM AND CHECK VALVE THEREFOR
Filed Aug. 15, 1932   3 Sheets-Sheet 2
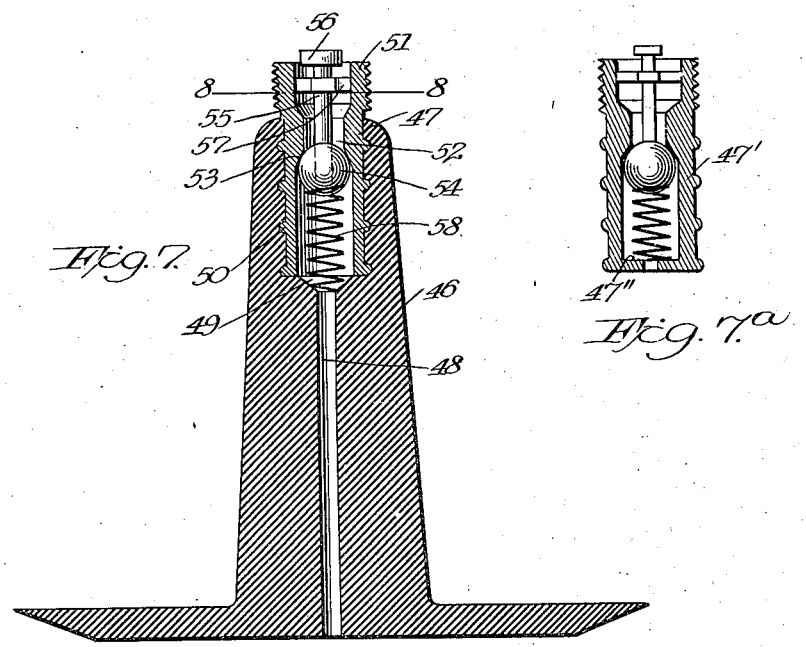
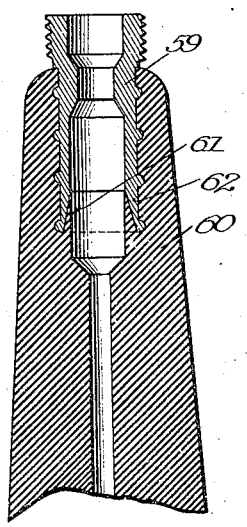
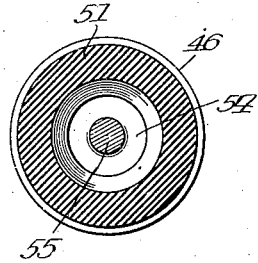
Inventor
Frank H. Watson.
Attorneys

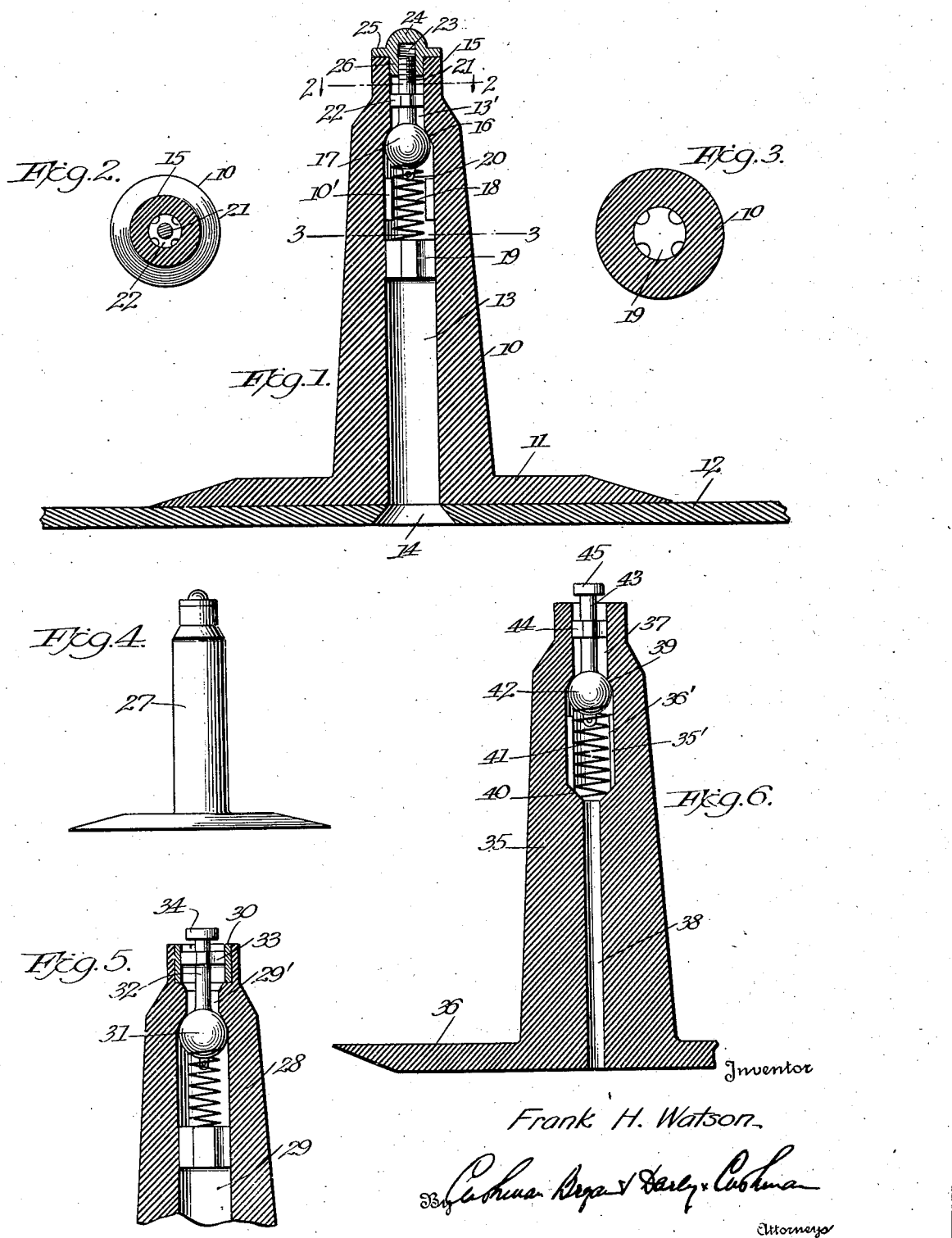

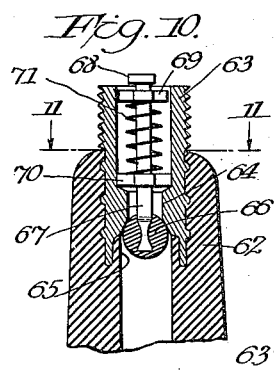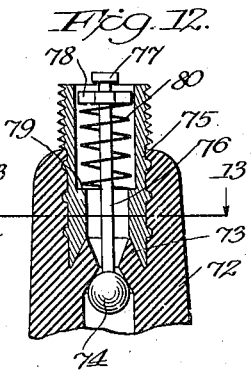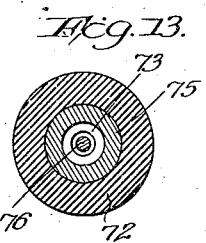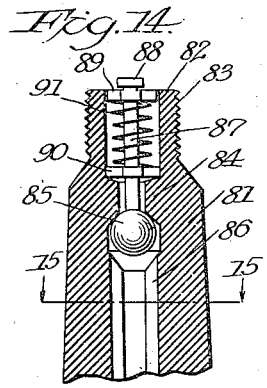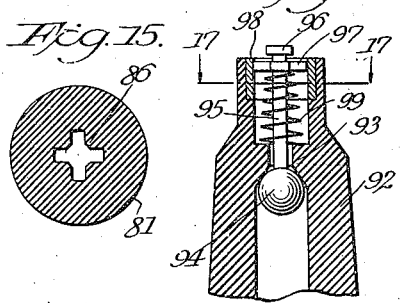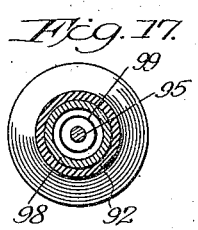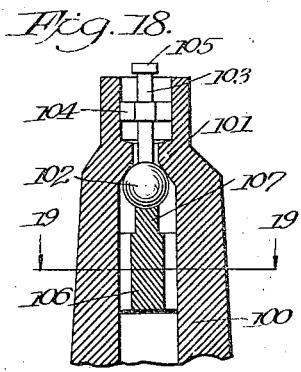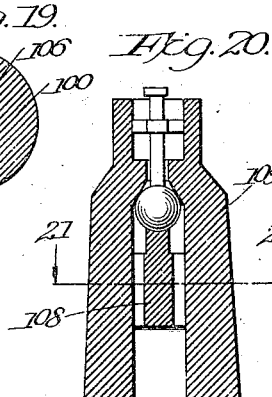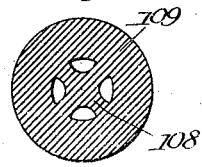

Patented Jan. 25, 1938

2,106,671

UNITED STATES PATENT OFFICE 2,106,671

VALVE STEM AND CHECK VALVE THEREFOR

Frank H. Watson, Jonesboro, Ark.

Application August 15, 1932, Serial No. 628,953

31 Claims. (Cl. 152—12)

The present invention relates to valve stems and check valves therefor and has as its object a simplified combination of parts wherein elements heretofore essential are eliminated without loss of effectiveness and at a considerable saving in manufacturing costs. While the invention in some of its broader aspects relates to combinations including valve stems generally, the use of valve stems of yieldable material such as rubber or rubber composition is preferable and in some instances essential. That is to say, more specifically, the invention relates to valve stems of the type disclosed in Reissue Patent No. 18,513, issued to me on July 5, 1932, and I have chosen to illustrate the invention as applied to valve stems of this type.

According to one form which the invention may take, a valve stem of rubber composition is provided with a through passage presenting a downwardly faced shoulder directly against which is adapted to seat a check valve which latter is subject to variation in design as regards its form and appurtenant elements. According to another form which the invention may take, a tubular liner or nipple of relatively rigid material, such as metal, is secured in the upper end of the valve stem passage and provides a seat with which the check valve directly cooperates. As indicative of the scope of the invention, various embodiments thereof have been shown in the accompanying drawings, and these embodiments, as illustrative of the invention, will be specifically described hereinafter.

In the drawings:

Figure 1 is an axial section of a valve stem constructed in accordance with the present invention;

Figure 2 is a section on line 2—2 of Figure 1;

Figure 3 is a section on line 3—3 of Figure 1;

Figure 4 is an elevation of a valve stem differing from the stem of Figure 1 only in shape;

Figure 5 is an axial section of a valve stem showing a modified check valve arrangement;

Figure 6 is an axial section of a valve stem showing a further modified check valve arrangement;

Figure 7 is an axial section of a valve stem embodying a nipple of metal or other relatively rigid material at its upper end receiving the check valve;

Figure 7a shows a nipple and valve of the type shown in Figure 7, the unit, however, being self-contained;

Figure 8 is a section on line 8—8 of Figure 7;

Figure 9 is an axial section of a valve stem including a modified form of nipple;

Figures 10, 12, 14, 16, 18, and 20 are axial sections of valve stems showing modified check valve arrangements; and Figures 11, 13, 15, 17, 19, and 21 are sections on the corresponding lines of Figures 10, 12, 14, 16, 18, and 20, respectively.

In the drawings, the stems are shown in upright position and for the sake of convenience of description, will be considered to occupy this position herein.

Referring to the drawings, reference number 10 designates a valve stem of yieldable material, such as rubber or rubber composition, here shown as being integral with a flap or patch 11 vulcanized to the exterior surface of a tube 12. The stem is provided with a through passage 13 registering with an aperture 14 in the tube. As shown in Figure 1, the stem is tapered from its base to its tip and presents an exterior surface uninterrupted longitudinally by any protuberances. Preferably the stem is externally unconfined by any reinforcing bands or the like and the upper end of the stem is reduced to form an exteriorly cylindrical extremity 15. Desirably, the stem may be made of a rubber composition including freely intermixed fibres which serve to reinforce the stem against appreciable distension.

The upper end 13' of passage 13 is reduced so that a downwardly faced circumferential shoulder 16 is provided. A globular check valve 17 seats upwardly against shoulder 16 and is normally held there against by means of a compression spring 18 which at its lower end rests against a cruciform abutment or spider 19 which is held in passage 13 through frictional engagement with the walls of the latter or by vulcanization or cement. The upper end of spring 18 may be engaged in an eye 20 formed in a lug at the bottom of check valve 17. Inward movement of the check valve is limited as by ribs 19' formed on the passage walls below the valve.

A pin 21 projects upwardly from the valve 17 through passage 13' and has fixed thereon a cruciform element or spider 22 which is guided by the passage walls so as to maintain pin 21 coaxial with the passage and, consequently, the valve in proper relation to its seat. The valve, pin, and spider are preferably formed in one piece of metal or other rigid material.

The upper end of pin 21 is threaded and is adapted to be engaged in a threaded bore 23 of a cap 24, the cap having a radial flange 25 adapted to seat on the tip end of the stem so that upon application of the cap and its abutment with the stem tip, valve 17 is positively drawn against the seat constituted by shoulder 16. Cap 24 has a sleeve portion 26 guided in passage 13'.

If the tire is to be inflated, cap 24 is removed, whereupon a chuck is attached to the cylindrical portion 15 of the stem and air supplied in the usual manner, the valve 17 lowering against the force of spring 18 to permit influx and being again seated by the spring upon completion of the operation. Cylindrical portion 15 is of such size and its material is of such nature that a screw coupling of the type customarily provided with hand pumps may be screwed thereon, forming complementary threads on the stem.

The stem 27 shown in Figure 4 is externally cylindrical instead of tapering, its valve provisions being exactly the same as those shown in Figures 1 to 3.

The arrangement shown in Figure 5 is generally similar to that of Figures 1 to 3. Here, however, the stem 28, which has a through passage 29 with a constricted portion 29', is provided with a metal ferrule or tubular insert 30 set in the upper end of the passage, which is again enlarged to receive it. The ferrule reinforces the tip of the stem against the compressive action of the air hose coupling. The check valve 31 has a pin 32 projecting axially of the ferrule and provided with a spider 33 guided by the latter. In the normal position of the valve, the pin projects above the tip of the stem and is provided at its extremity with a radially expanded enlargement or head 34. Head 34 constitutes a guard and is accessible for manipulation of the check valve as in unseating the latter to cause deflation. A cap need not necessarily be used but, if desired, may be directly screwed on the reduced tip of the stem. Ferrule 30, it may be added, constitutes non-frictional guiding means for spider 33.

According to Figure 6, the valve stem 35 has an integral base or flap 36 shaped for vulcanization to the inner surface of the tube, although it will be understood that it is immaterial to the invention whether the flap is shaped as in Figure 6 or as in Figures 1 and 4. The stem is traversed by a through passage which has an enlargement 36' between end portions 37 and 38 of restricted diameter, the enlargement 36' being partially bounded by upper and lower annular shoulders 39 and 40. The upper portion 37 of the passage is of such a size as to permit the insertion of a compression spring 41 therethrough so as to rest with its lower end on shoulder 40, the upper end of the spring being, as here shown, fastened to the lower end of a globular check valve 42 preferably formed integral with a pin 43, spider 44 and head 45. The valve is forcibly inserted through passage 37 by distending the latter or compressing the stem material. When the valve passes below shoulder 39, the natural resiliency of the stem material causes passage 37 to resume its normal size and valve 42 is thereupon seated against shoulder 39 by spring 41, the spider being in guided relation to the walls of passage 37, the head 45 extending somewhat above the tip of the stem. Valve 42 is preferably made of metal or other long wearing, relatively non-yieldable material. In order to limit inward movement of the valve, ribs, as at 35', may be provided in the enlargement below the valve. Such ribs also serve to maintain the spring against buckling.

According to Figure 7, the stem 46 has a through passage in the upper enlarged portion of which is vulcanized a sleeve liner or nipple 47, the lower portion 48 of the passage being restricted in diameter as compared to the internal diameter of the nipple so that a shoulder 49 exists below the liner.

The nipple is preferably provided externally with circumferential ribs 50 and has a threaded extremity 51 projecting above the tip of the rubber stem so as to be adapted to receive a cap whose lower end may seat on the top surface of stem 46. Adjacent its upper end, the nipple passage is constricted as at 52 so that a downwardly faced shoulder 53 is provided. Reference numeral 54 designates a globular check valve of compressible material fixed, as by vulcanization, on a pin or shank 55 which has formed thereon a head 56 normally projecting slightly above the top of the nipple, and a spider 57 guided above the restriction 52. In assembly, a compression spring 58 is inserted through the nipple and seated at its lower end on shoulder 49. Valve 54 is then forced through the restricted passage 52, the resilient material of the valve being temporarily distorted but immediately resuming its normal globular shape after the constriction is passed so that the valve operatively seats against shoulder 53 under the action of spring 58. The length of nipple 47, together with its cap, if one is used, should not be substantially greater than the circumferential extent of the rim aperture through which the stem is passed, if maximum withdrawability is a consideration, the proper portions being fully discussed in my patent above mentioned.

The liner 47' shown in Figure 7a is the same as the liner 47 in Figure 7, with the exception that liner 47' has at its lower end an inwardly projecting annular ledge 47" which serves as an abutment for the lower end of the valve spring.

In Figure 9, reference numeral 59 designates a nipple of the same general type as that described above with reference to Figure 7, the same type of valve and appurtenances being contemplated. In order to oppose the stripping tendency of air under pressure in the stem passage and to effect a more secure union between the nipple and stem 60, however, the stem at the lower end of the passage portion which receives the nipple is provided with a ledge formed with an integral conical collar 61 concentric with and spaced inwardly from the passage walls. The lower end 62 of the liner is conically reduced interiorly and engaged in the recess between the collar and passage walls and vulcanized in this position. Collar 61 obviates any possibility of pressure entering between the liner and stem so that leaks cannot develop from this cause.

According to Figures 10 and 11, the tip end of the stem 62 has fixed therein a nipple similar to that of Figure 9, with the exception that the nipple 63 has a constriction 64 adjacent its lower end. The lower end of the nipple is embedded in the stem material, so that its lower inner margin is covered by means of an annular flap or collar 65 and the nipple presents a seat for a rubber check valve 66 immediately above this collar. The check valve 66 is fixed on the lower end of a pin 67, which at its other end is provided with a head 68. As is shown in Figure 10, the end of the pin embedded in the check valve 66 is somewhat flattened, so that secure anchorage is provided, and the material of the check valve covers the lower end of the pin so as to prevent pressure from entering between the pin and the check valve. Pin 67 has a spider 69 fixed thereon below head 68 for guidance in the upper portion of the nipple passage, the spider in large part filling the tip end of the passage, as clearly shown in Figure 11. Also, the pin is slidable in a spider 70 which seats downwardly on a shoulder at the top of the constriction 64, a compression spring 71 being interposed between the two spiders. Assembly is made by forcing the check valve 66 downwardly through the constriction in the manner above described, spring 71 reacting against spider 70 to hold the check valve 66 normally seated against the shoulder at the lower end of the constriction.

According to Figures 12 and 13, the upper end of stem 72 is provided internally with an integral conically shaped collar 73 which constricts the stem passage and provides a downwardly faced shoulder for the check valve 74, which is of relatively rigid material, such as metal. The lower end of the nipple or tubular insert 75 engages around collar 73, so that the latter serves to provide not only a seat for the check valve, but also to prevent access of pressure between the nipple and stem, the insert being secured in the rubber stem body by vulcanization, as mentioned in connection with the embodiment of Figure 9. The check valve has a pin 76 fixed thereto at one end, the other end of the pin being provided with a head 77, which, in the seated position of the check valve, projects somewhat above the top of the nipple. A spider 78 is fixed to the pin 76 immediately below the head 77, and between this spider and shoulder 79 formed in the nipple is interposed a compression spring 80, which serves to seat the check valve.

According to Figures 14 and 15, the stem 81, or at least its tip portion 82, is considered to be made of rubber sufficiently hard to take threads 83 engageable by a filling connection or cap. The through passage of the stem has a constricted portion 84, beneath which is adapted to seat a check valve 85, the downward movement of the check valve being limited through its abutment with the top of ribs 86 projecting inwardly from the passage walls. A pin 87 is fixed to the check valve 85 and is provided with a head 88. A spider 89 is fixed to the pin 87 beneath the head, and the pin is slidable in a spider 90 which seats downwardly on a shoulder provided at the top of the constricted portion 84. A compression spring 91 interposed between the two spiders serves to hold the valve 85 in normally seated position. Here, as in Figures 6 and 12, the valve is inserted to its operative position through the constricted portion of the passage, which is temporarily enlarged.

According to Figures 16 and 17, the stem 92 is provided with a through passage having a constriction 93 presenting at its top a substantially square shoulder and at its bottom a flared or bevelled shoulder against which is adapted to seat a check valve 94 of relatively rigid material. A pin 95 secured to the check valve is provided at its top end with a head 96 and beneath the head with a spider 97 guided in a ferrule or tubular insert 98 which lines the top portion of the stem passage and reinforces the tip of the stem against compression. A conical compression spring 99 surrounds the pin 95 beneath spider 97, and upon insertion of the valve through the passage restriction, rests with its large end upon the square shoulder at the top of the restriction, reacting thereon to seat the valve.

The valve stem 100 of Figures 18 and 19 has a through passage with a constriction 101, beneath which, upon forcible insertion therethrough, is seated a check valve 102. A pin 103 fixed to the check valve has thereon a spider 104 guided in the stem passage above the constriction. At its top extremity the pin is provided with a head 105. A plug 106, here shown as being substantially cruciform in cross section, is inserted in the stem passage through the lower end thereof to a position in which an upward reduced projection 107 of the plug rests against the bottom of the check valve to hold the latter seated. Preferably, the upper end of the projection 107 is slightly dished or concaved, so that relative sliding between it and the valve is prevented. The plug and its projection are of yieldable material, such, for example, as the material of the stem itself, so that in the filling operation the valve is permitted to unseat sufficiently, being immediately returned to seating position upon the breaking of the supply connection. This form of the invention does away with the use of the metal spring. The plug 106 is held in position frictionally or by cement or vulcanization.

The arrangement shown in Figures 20 and 21 is exactly the same as that shown in Figures 18 and 19, with the exception that plug 108 forms an integral part of the stem 109, this construction being entirely feasible and presenting obvious advantages.

Where no stiffening is provided for the tip end of the stem, means are preferably provided to limit the unseating movement of the check valve, so that the head of the latter will serve to open the valve of the filling chuck, since otherwise partial collapse of the tip end may obstruct this action. A globular check valve is preferred, although this shape is not essential. The shape of the check valve should be such that it may seat properly against the cooperating shoulder, and where it is to be forcibly inserted through a constriction, it should be so shaped as to facilitate such insertion. It may be stated that by grasping the head of the valve pin and slightly lubricating the valve, as with soapy water, the latter may be very easily forced through the stem constriction, and there is no danger whatever of its being expelled from the stem under any ordinary air pressure.

From the above it will be seen that the invention contemplates a valve stem providing direct cooperation with a check valve and its appurtenances so that a relatively cheap construction is afforded but without any loss in efficiency. While I prefer to use a yieldable valve stem, it will be understood that I do not necessarily limit myself entirely in this respect or in respect of the other details of construction shown and described. The invention includes all constructions coming within the scope of the following claims.

I claim:

1. A valve stem comprising a rubber valve stem body having a longitudinally extending passage therethrough, means constricting the passage at the tip end of the stem and providing an annular shoulder faced toward the base of the stem, an abutment in said passage between said shoulder and the base of the stem, a spiral spring between said shoulder and abutment, said spring being insertable to position and removable through said constricting means without substantial distortion of either the constricting means or the spring, valve means in said passage and seated against said shoulder by said spring, said valve means being insertable to position and removable through said constricting means, one of said means being of yieldable material to permit such insertion and removal of the valve means, a pin fixed to said valve means and projecting toward the tip of the stem within said constricting means, said pin being engageable for manipulation of the valve means, a tubular portion of relatively rigid material above said shoulder, and guide means within said tubular portion maintaining said pin substantially coaxial with said tubular portion in all positions of the valve means relative to its seat.

2. A valve stem comprising an elongated rubber body provided with a longitudinal passage, the passage being constricted adjacent the tip of said body to provide an annular valve seat of the body material faced toward the base of the body, a movable valve member cooperative with said seat to close said passage, a compression spring engaging said valve member to seat the same, and an abutment for said spring inserted in the base end of said passage by direct longitudinal movement and held in position through the contractive effect of the body thereupon.

3. A valve stem comprising an elongated rubber body of generally tapered form from base to tip and having a longitudinally extending passage therethrough, the body having an integral inwardly thickened portion at its tip portion to provide an annular valve seat in said passage faced toward the base of the body, and a spring-urged movable valve member cooperative with said seat to close said passage, the inward thickening of the body at its tip portion strengthening the tip portion in compensation of the comparative thinness of the body walls thereat which would otherwise exist by reason of the taper.

4. A valve stem comprising an integral elongated rubber body provided with a base flap for attachment to an inner tube, said body and flap being traversed by a passage which extends longitudinally of said body, said passage being constricted adjacent its end remote from said flap to provide an integral annular shoulder of the body material faced toward said flap, and a movable valve body cooperating with said shoulder to seal said passage, said stem being of such flexibility in its portion between said constriction and flap as to permit it to bend and withdraw through a rim opening in use without being torn from the tube.

5. A valve stem comprising an elongated rubber body provided with a base flap for attachment to an inner tube, said body and flap being traversed by a passage which extends longitudinally of said body, said passage being constricted adjacent its end remote from said flap to provide an integral annular shoulder of the body material faced toward said flap, a tubular metal insert in said body outwardly of said constriction for preventing collapse of the tip portion of said body, and a movable valve body cooperating with said shoulder to seal said passage, said stem being of such flexibility in its portion between said constriction and flap as to permit it to bend and withdraw through a rim opening in use without being torn from the tube.

6. A valve stem comprising a rubber valve stem body having a longitudinally extending through passage constricted to provide at the lower end of the constriction an integral downwardly faced shoulder adapted to serve as a valve seat, there being an upwardly faced ledge above said constriction, a tubular metal insert secured in the passage above said constriction, a movable valve body cooperating with said shoulder, a pin on said valve body extending through said constriction and within said insert, means fixed on said pin and positioned by said insert to maintain the pin centrally of the insert when the valve body is seated, and a compression spring having its ends bearing against said ledge and fixed means respectively.

7. A valve stem comprising a rubber valve stem body having a longitudinally extending through passage constricted to provide at the lower end of the constriction an integral downwardly faced shoulder adapted to serve as a valve seat, there being an upwardly faced ledge above said constriction, a tubular metal insert secured in the passage above said constriction, a movable valve body cooperating with said shoulder, a pin on said valve body extending through said constriction and within said insert, means fixed on said pin and positioned by said insert to maintain the pin centrally of the insert when the valve body is seated, said fixed means being at the extreme upper end of the insert when said valve body is seated and closing said insert at least in large part, and a compression spring having its ends bearing against said ledge and fixed means respectively.

8. A valve stem comprising a rubber valve stem body having a longitudinally extending through passage constricted to provide at the lower end of the constriction an integral downwardly faced shoulder adapted to serve as a valve seat and to provide at the upper end of the constriction an abutment ledge, a tubular metal insert secured in the passage above said constriction, a movable valve body cooperating with said shoulder, a pin on said valve body extending through said constriction and within said insert, means fixed on said pin and positioned by said insert to maintain the pin centrally of the insert when the valve body is seated, and a compression spring having its ends bearing against said ledge and fixed means respectively.

9. A valve stem comprising a rubber valve stem body having a longitudinally extending passage therethrough from base to tip, means constricting the passage at the tip end of the stem and providing an annular shoulder faced toward the base of the stem, movable valve means in said passage and adapted to seat against said shoulder to close said passage, a pin fixed to said valve means and projecting toward the tip of the stem within said constricting means, and guide means in the passage above said shoulder to maintain said pin substantially coaxial with said passage when said movable valve means is seated.

10. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat and having an inwardly extending ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated.

11. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat and having an inwardly extending ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated, said abutment being in guided relation to the interior of said insert so as to maintain said pin coaxial with said insert when said valve body is seated.

12. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat and having an inwardly extending ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated, said abutment being in guided relation to the interior of said insert so as to maintain said pin coaxial with said insert when said valve body is seated and at least in large part filling the tip end of said insert.

13. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat with its inner portion in substantially surrounding relation to said shoulder whereby to sustain the latter against undue radial expansion in use, said insert having an inwardly extending portion providing a ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated.

14. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat with its inner portion in substantially surrounding relation to said shoulder whereby to sustain the latter against undue radial expansion in use, said insert having an inwardly extending portion providing a ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated, said abutment being in guided relation to the interior of said insert so as to maintain said pin coaxial with said insert when said valve body is seated.

15. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat with its inner portion in substantially surrounding relation to said shoulder whereby to sustain the latter against undue radial expansion in use, said insert having an inwardly extending portion providing a ledge faced toward the tip of the stem, a movable valve body cooperable with said seat, a pin on said valve body extending past said shoulder and within said insert, an abutment on said pin, and a compression spring having its ends bearing against said ledge and said abutment respectively and normally yieldingly holding said valve body seated, said abutment being in guided relation to the interior of said insert so as to maintain said pin coaxial with said insert when said valve body is seated and at least in large part filling the tip end of said insert.

16. A valve stem comprising a rubber valve stem body having a longitudinal through passage cross-sectionally reduced intermediate its ends to provide a shoulder faced toward the base of the stem, a movable valve body cooperable with said shoulder as a seat, and a tubular metal insert lining the tip end of said passage and entirely covered circumferentially by the body material.

17. A valve stem comprising a rubber valve stem body having a longitudinal through passage cross-sectionally reduced intermediate its ends to provide a shoulder faced toward the base of the stem, a movable valve body cooperable with said shoulder as a seat, a tubular metal insert lining the tip end of said passage and entirely covered circumferentially by the body material, a pin on said valve body and extending past said shoulder and within said insert, and a head on said pin slidably guided by the inner walls of said insert and serving to maintain said pin coaxial with said insert when said valve body is seated.

18. A valve stem comprising a rubber valve stem body having a longitudinal through passage cross-sectionally reduced intermediate its ends to provide a shoulder faced toward the base of the stem, a movable valve body cooperable with said shoulder as a seat, a tubular metal insert lining the tip end of said passage and entirely covered circumferentially by the body material, a pin on said valve body and extending past said shoulder and within said insert, and a head on said pin slidably guided by the inner walls of said insert and serving to maintain said pin coaxial with said insert when said valve body is seated, said head at least in large part filling the outer end of said insert when said valve body is seated.

19. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular insert positioned circumferentially wholly within said rubber body and extending to the tip end of the latter.

20. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular insert positioned circumferentially wholly within said rubber body and extending to the tip end of the latter, said body having a continuous unconfined exterior surface compressible throughout its length.

21. A valve stem for pneumatic tires comprising a tubular rubber body of generally tapered form the tip end of which is of smaller diameter than its base end and which is of such shape exteriorly as not to obstruct its withdrawal lengthwise through the aperture of a wheel rim while the latter is rotating, and a relatively rigid tubular insert positioned circumferentially wholly within said rubber body and extending to the tip end of the latter, said body having a continuous unconfined exterior surface compressible throughout its length, said insert being confined in length to the tip end of said body.

22. A valve stem comprising a rubber valve stem body having a longitudinally extending through passage constricted to provide at the lower end of the constriction an integral downwardly faced shoulder adapted to serve as a valve seat, there being an upwardly faced ledge above said constriction, a tubular metal insert secured in the passage above said constriction, a movable valve body cooperating with said shoulder, a pin on said valve body extending through said constriction and within said insert, an abutment on said pin above said ledge, and a compression spring having its ends bearing against said ledge and said abutment respectively.

23. A valve stem comprising a rubber valve stem body having a longitudinally extending through passage having intermediate the ends thereof a change in cross-section providing an integral downwardly faced shoulder adapted to serve as a valve seat, a tubular metal insert secured in said body above said seat and having an inwardly extending ledge faced toward the tip of the stem, said insert extending to the tip end of said body and being surrounded circumferentially by the body material, a movable valve body cooperable with said seat, a pin on said valve body extending past said shoulder and within said insert, an abutment on said pin, and a compression spring having its ends bearing against said ledge and said abutment respectively and normally yieldingly holding said valve body seated.

24. A valve stem comprising an elongated rubber body provided with a base flap for attachment to an inner tube, said body and flap being traversed by a passage which extends longitudinally of said body, a tubular metal insert in said body for preventing collapse of the tip portion of said body, said insert being entirely surrounded circumferentially by the body material, and valve provisions in said passage for sealing the latter against flow from base to tip.

25. A valve stem comprising a rubber body portion provided with a longitudinal passage extending from base to tip, said passage being formed with a constriction adjacent its tip whereby a shoulder of the body material faced toward the base of the stem is provided, a valve element normally held seated against said shoulder, and a relatively rigid insert secured in said rubber body portion and surrounding said shoulder in such manner as to resist distention of the latter by the valve element.

26. A valve stem comprising a rubber body portion provided with a longitudinal passage extending from base to tip, said passage being formed with a constriction intermediate its ends whereby a shoulder of the body material faced toward the base of the stem is provided, a valve element normally held seated against said shoulder, and a relatively rigid insert secured in said rubber body portion and surrounding said shoulder in such manner as to resist distention of the latter by the valve element.

27. A valve stem comprising a rubber body portion provided with a longitudinal passage extending from base to tip, said passage being formed with a constriction adjacent its tip whereby a shoulder of the body material faced toward the base of the stem is provided, a valve element normally held seated against said shoulder, and a relatively rigid insert secured in said rubber body portion and surrounding said shoulder in such manner as to resist distention of the latter by the valve element, said insert having a flared lower portion.

28. A valve stem comprising a rubber body portion provided with a longitudinal passage extending from base to tip, said passage being formed with a constriction intermediate its ends whereby a shoulder of the body material faced toward the base of the stem is provided, a valve element normally held seated against said shoulder, and a relatively rigid insert secured in said rubber body portion and surrounding said shoulder in such manner as to resist distention of the latter by the valve element, said insert having a flared lower portion.

29. A valve stem for pneumatic tires comprising a tubular rubber body of generally tapered form, the tip end of which is of smaller diameter than its base end and which is of such shape exteriorly as not to obstruct its withdrawal lengthwise through the aperture of a wheel rim while the latter is rotating, an integral annular shoulder formed in said tubular rubber body and faced toward the base end of the latter, a movable valve body cooperable with said shoulder as a seat, and a relatively rigid tubular insert positioned circumferentially wholly within said rubber body and extending from the tip end of the latter into adjacency with said shoulder.

30. A valve stem comprising an elongated rubber body portion provided with a longitudinal passage extending from base to tip, and a relatively rigid annular insert secured in the tip end of said passage, said insert having an inner end completely embedded in the body material whereby to oppose the stripping tendency of air under pressure in said passage.

31. A valve stem comprising a rubber valve stem body having a longitudinally extending through passage, means constricting the passage intermediate its ends to provide a downwardly faced shoulder adapted to serve as a valve seat and to provide at the upper end of the constriction an abutment ledge, a valve body positioned below said seat and cooperable therewith to seal said passage, a pin fixed to said valve body and extending upwardly through said constriction and beyond said ledge, a compression spring surrounding the pin above said ledge and seated at one end on the latter, and means on said pin cooperating with the other end of said spring.

FRANK H. WATSON.